(12) United States Patent
Milliken (10) Patent No.: US 9,231,989 B2
(45) Date of Patent: Jan. 5, 2016

(54) EXPERIENCE AND EMOTION ONLINE COMMUNITY SYSTEM AND METHOD

(71) Applicant: Milligrace Productions, LLC, Paradise Valley, AZ (US)

(72) Inventor: Kate Milliken, Paradise Valley, AZ (US)

(73) Assignee: MILLIGRACE PRODUCTIONS, LLC, Paradise Valley, AZ (US)

( * ) Notice: Subject to any disclaimer, the term of this patent is extended or adjusted under 35 U.S.C. 154(b) by 257 days.

(21) Appl. No.: 13/759,772

(22) Filed: Feb. 5, 2013

(65) Prior Publication Data

US 2013/0219300 A1 Aug. 22, 2013

Related U.S. Application Data

(60) Provisional application No. 61/595,516, filed on Feb. 6, 2012, provisional application No. 61/606,157, filed on Mar. 2, 2012, provisional application No. 61/700,630, filed on Sep. 13, 2012.

(51) Int. Cl.
*G06F 3/0482* (2013.01)
*H04L 29/06* (2006.01)
*G06Q 50/00* (2012.01)

(52) U.S. Cl.
CPC ............ *H04L 65/403* (2013.01); *G06F 3/0482* (2013.01); *G06Q 50/01* (2013.01)

(58) Field of Classification Search
CPC ............................... G06F 3/048; G06F 3/0482
USPC ........................................................ 715/753
See application file for complete search history.

(56) References Cited

U.S. PATENT DOCUMENTS

| 8,386,340 | B1 * | 2/2013 | Feinstein | 705/27.1 |
| 2002/0150872 | A1 * | 10/2002 | Glenn et al. | 434/236 |
| 2006/0170945 | A1 * | 8/2006 | Bill | 358/1.13 |
| 2007/0162606 | A1 * | 7/2007 | Chen et al. | 709/227 |
| 2007/0250791 | A1 * | 10/2007 | Halliday et al. | 715/808 |
| 2008/0082613 | A1 * | 4/2008 | Szeto et al. | 709/206 |
| 2008/0189331 | A1 * | 8/2008 | Lee et al. | 707/104.1 |
| 2009/0012988 | A1 * | 1/2009 | Brown | 707/102 |
| 2009/0100455 | A1 * | 4/2009 | Frikker et al. | 725/13 |
| 2009/0177607 | A1 * | 7/2009 | Matsushima | 706/46 |
| 2009/0234888 | A1 * | 9/2009 | Holmes et al. | 707/104.1 |
| 2010/0057875 | A1 * | 3/2010 | Bychkov et al. | 709/206 |

(Continued)

OTHER PUBLICATIONS

Jab_904, "Points/Karma given for 'liking' Posts?", posted Jul. 16, 2009, https://www.phpbb.com/community/viewtopic.php?f=72&t=1696425.*

*Primary Examiner* — Reza Nabi
*Assistant Examiner* — Daniel Rodriguez
(74) *Attorney, Agent, or Firm* — Snell & Wilmer L.L.P.

(57) ABSTRACT

A system is disclosed for creating, operating and participating in an online community that brings its users together via similar experiences (e.g., chronic illnesses) the users are having in their lives and/or the emotions those users are feeling during those experiences. The method may include receiving pane information, creating a pane including the pane information, wherein a counterpane comprises a plurality of panes, receiving a mood indicator representing a mood associated with the pane, associating the mood indicator with the pane, receiving a request for a requested mood, searching the counterpane for requested panes associated with the requested mood and distinguishing the requested panes.

16 Claims, 6 Drawing Sheets (56) References Cited

U.S. PATENT DOCUMENTS

| | | | |
|---|---|---|---|
| 2010/0099955 A1* | 4/2010 | Thomas et al. | 600/300 |
| 2010/0131878 A1* | 5/2010 | Fujioka | 715/765 |
| 2010/0153131 A1* | 6/2010 | Grace et al. | 705/2 |
| 2010/0235776 A1* | 9/2010 | Brown | 715/772 |
| 2011/0014932 A1* | 1/2011 | Estevez | 455/466 |
| 2011/0046980 A1* | 2/2011 | Metzler et al. | 705/3 |
| 2011/0046981 A1* | 2/2011 | Metzler et al. | 705/3 |
| 2011/0047404 A1* | 2/2011 | Metzler et al. | 714/2 |
| 2011/0047508 A1* | 2/2011 | Metzler et al. | 715/810 |
| 2011/0124977 A1* | 5/2011 | Winarski | 600/301 |
| 2012/0047447 A1* | 2/2012 | Haq | 715/752 |
| 2012/0158753 A1* | 6/2012 | He et al. | 707/752 |
| 2012/0174032 A1* | 7/2012 | Greene et al. | 715/811 |
| 2013/0018882 A1* | 1/2013 | Listermann | 707/736 |

* cited by examiner

FIG. 1

| MODIFIER | DATE | KEYWORD SEARCH |

- ALONE
- CALM
- DETERMINED
- CONFIDENT
- SAD
- SCARED

- HAPPY
- HOPEFUL
- FRUSTRATED
- CONFUSED
- LONELY
- SYMPTOMS

[SELECT ALL] [UN-SELECT ALL] [SHOW RESULTS]

EXPERIENCE AND EMOTION ONLINE COMMUNITY SYSTEM AND METHOD

CROSS-REFERENCE TO RELATED APPLICATIONS

This application claims priority to and the benefit of U.S. Provisional Patent No. 61/595,516 filed on Feb. 6, 2012 and entitled "EXPERIENCE AND EMOTION ONLINE COMMUNITY SYSTEM AND METHOD;" and U.S. Provisional Patent No. 61/606,157 filed on Mar. 2, 2012 and entitled "EXPERIENCE AND EMOTION ONLINE COMMUNITY SYSTEM AND METHOD;" and U.S. Provisional Patent No. 61/700,630 filed on Sep. 13, 2012 and entitled "EXPERIENCE AND EMOTION ONLINE COMMUNITY SYSTEM AND METHOD." All of which are incorporated herein by references.

FIELD

The disclosure relates to online communities, and more particularly, to systems and methods for creating, operating and/or participating in an online community that brings its users together via similar experiences the users are having.

BACKGROUND

Many websites exist where users can research certain information or data about companies or people. Users may be able to search for pictures, business contacts, product information, opinions or relationships with other people. However, these websites are often limited to resume information, product information, pictures of family and friends and comments about current activities. A need exists for a system and method that allows users to connect with other users on an emotional level by bringing its users together via the similar experiences the users are having in their lives and/or the emotions those users are feeling during those experiences.

SUMMARY

The disclosure includes a system and method for creating, operating and participating in an online community that brings its users together via similar experiences (e.g., chronic illnesses) the users are having in their lives and/or the emotions those users are feeling during those experiences. The method may include receiving pane information, creating a pane including the pane information, wherein a counterpane comprises a plurality of panes, receiving a mood indicator representing a mood associated with the pane, associating the mood indicator with the pane, receiving a request for a requested mood, searching the counterpane for requested panes associated with the requested mood and distinguishing the requested panes.

BRIEF DESCRIPTION OF THE DRAWINGS

Additional aspects of the present disclosure will become evident upon reviewing the non-limiting embodiments described in the specification, and the claims taken in conjunction with the accompanying figures, wherein like numerals designate like elements, and wherein:

DETAILED DESCRIPTION

The detailed description of exemplary embodiments herein makes reference to the accompanying drawings and pictures, which show the exemplary embodiment by way of illustration. While these exemplary embodiments are described in sufficient detail to enable those skilled in the art to practice the disclosure, it should be understood that other embodiments may be realized and that logical, software and mechanical changes may be implemented without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions may be implemented by the website or the steps may be outsourced to, interfaced with or performed by one or more third parties. Furthermore, any reference to singular includes plural embodiments, and any reference to more than one component may include a singular embodiment.

In general, this disclosure relates to creating, operating and/or participating in an online community that brings its users together via similar experiences the users are having in their lives and/or the emotion(s) those users are feeling associated with those experiences (or during those experiences). For example, the community may relate to similar chronic illnesses, but the system and community may be applicable to many other types of experiences, emotions, issues, etc. Any portion of the website or function may be interfaced with third party websites (e.g. Facebook, Twitter, etc.). The system may be used by, for example, anyone who feels a need to tell their own story in an online environment and/or who are searching for people who share a common interest and sentiment. The functionality may apply to any industry, interest, group, association, organization and/or the like. For example, the functionality may apply to the health space. In various embodiments, communities may be created for people with chronic illness. Each disorder may have its own community (e.g., multiple sclerosis, cancer, ALS, Alcoholism, Autism, Parkinson's). The experience may be a chronic disorder, a health issue, a work issue, an interest, a political issue, an organization issue, an industry issue, a cultural issue or any other issue.

The system connects people on an emotional level. As such, the system creates, for example, stronger personal connections that may result in deep friendships, invaluable support for tough life moments and a trusting environment for swapping firsthand knowledge and updating close friends and family on the status and progression of an illness experience. This, in turn, may form communities that may be specific in experience and mindset.

From a commercial standpoint, such a system may offer opportunities for highly targeted sponsorship and advertising, as well as an opportunity for e-commerce in various embodiments, the system may include a multi-media platform using video, games, photos, experiences and/or text and ultimately may be accessible from and/or on all forms of computer devices (e.g., desktop, mobile, tablet, and other devices discussed herein). Access or use to any portion and/or function may be free or fee-based, or associated with rewards, points or a loyalty program.

Figure 1:
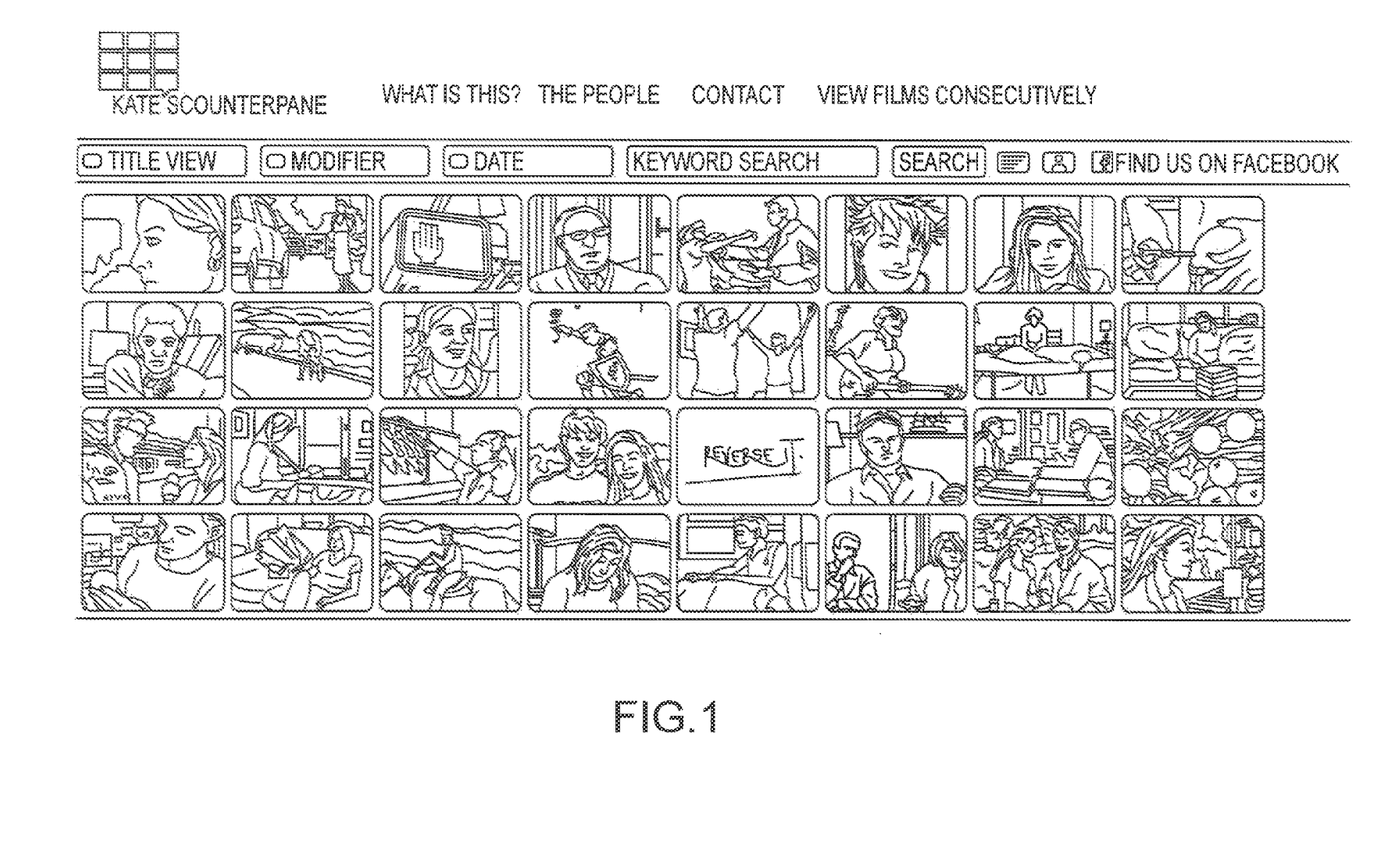
FIG. 1 is an exemplary counterpane having a plurality of panes, according to various embodiments of the disclosure.

The home page (or any other page/screen) may display a "counterpane" which may resemble a patchwork quilt, due to its design of thumbnail shots that represent the icons for each pane, as shown in FIG. 1. Each illness may have its own counterpane filled with users (a counterpane community). A number of ways exist for searching the counterpane. The home page for each user may include a number of ways the user can search the existing user panes such as, for example, age of user, gender of user, geographical location of user, mood of user, zip code and/or specific keywords (e.g., mirrored diagnosis terms).

Figure 2:
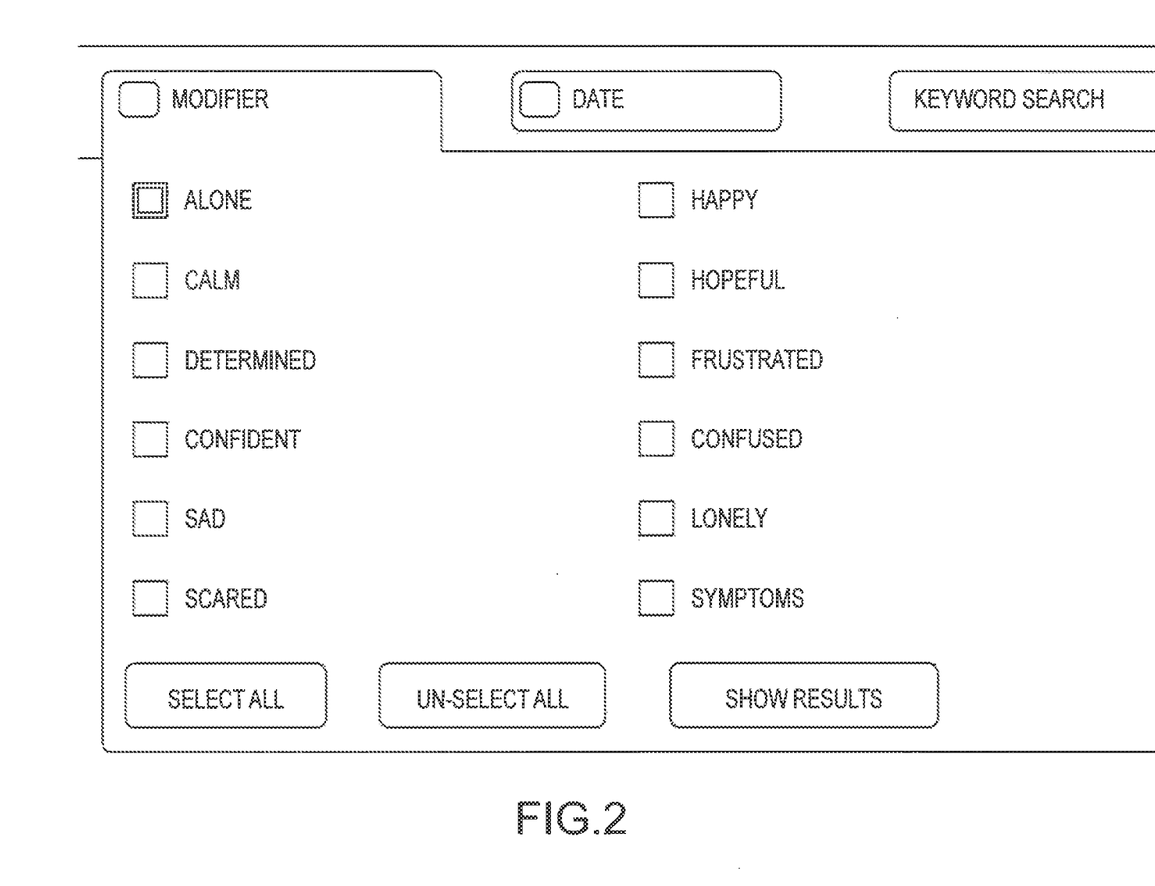
FIG. 2 is an exemplary search tool called a Moodifier for searching the counterpane of FIG. 1, according to various embodiments of the disclosure.
Figure 4:
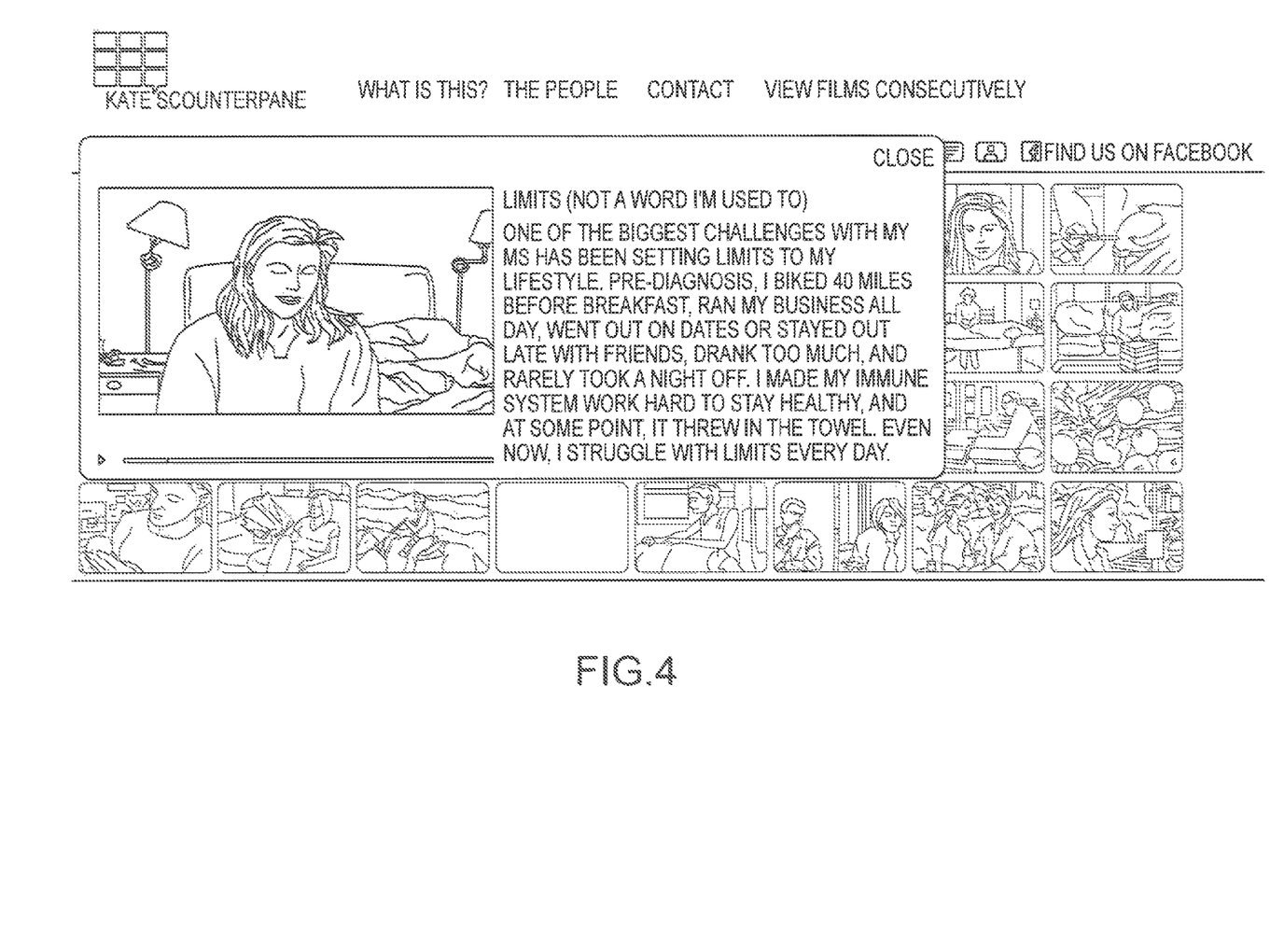
FIG. 4 is an example of an individual pane within the counterpane of FIG. 1, according to various embodiments of the disclosure.

One search method is called the Moodifier®, as shown in FIG. 2. In various embodiments, the Moodifier may provide a handful of emotions that a user might feel during an experience. When web users create a pane tan individual square on the My Counterpane site), the user describes their experience using, for example, text, photos and/or video. For an example of an individual pane, see FIG. 4. In various embodiments, users may keyword or tag the panes with the emotions they encountered (e.g., from a given list) in the experience they are describing. Such tagging may include, for example, associating metadata, using pointers and/or any other data association methods.

The Moodifer may function primarily though a built system that presents in the term of a graph ("The Moodifier Graph"). This graph presents the opportunity for users to chronicle their entire emotional journey with an issue, through personal storytelling. Users may be prompted for a date, then asked to choose one of the ten emotions and then to explain why they chose that emotion and what happened. In this space, text may be written or photos and videos may be uploaded using known or subsequently developed uploading technology. This Moodifier Graph serves as a way for users to view other users emotional journey in one glance. The trajectories from Moodifier Graphs can be identified as patterns (using known in the art or subsequently developed statistical analysis and patterning technologies). When a user enters a successive number of entries that parallel (or are similar to) the emotional path of another user, all or any subset of those users may be notified of this similarity and/or connected online. The Moodifier Graph may also allow a user to lay his/her own Moodifier Graphs on top of another user's Moodifier Graph to compare experiences.

Figure 3A:
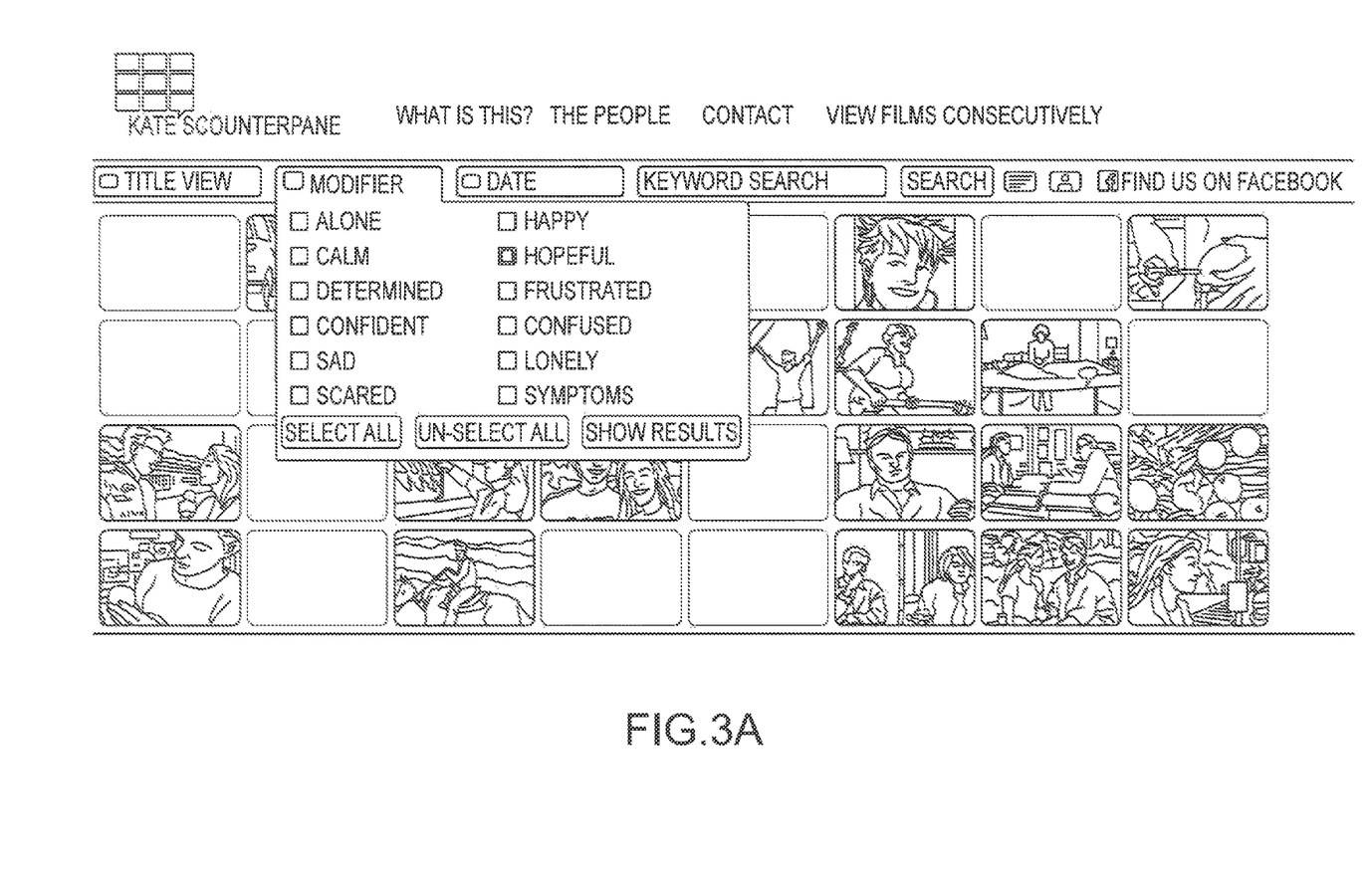
FIGS. 3A and 3B are exemplary search results showing certain panes distinguished that match the emotional keyword of the search, according to various embodiments of the disclosure.
Figure 3B:
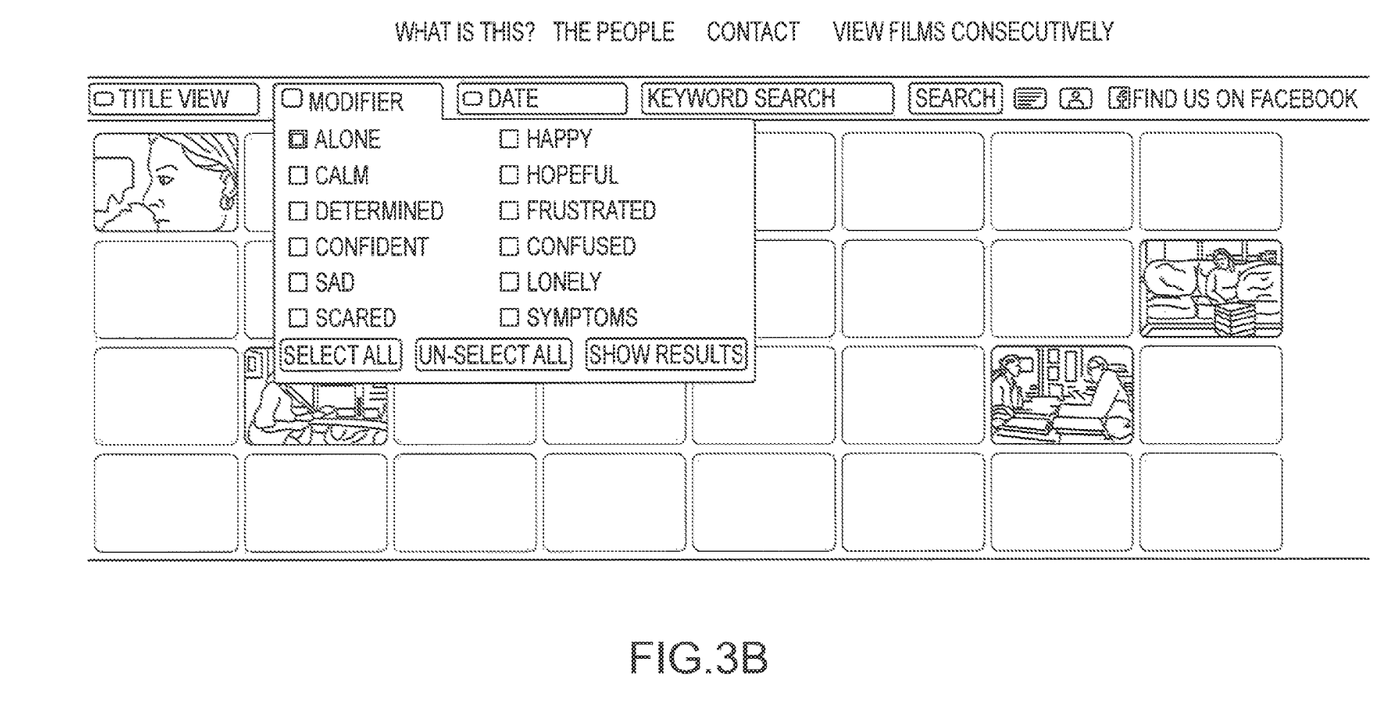

The Moodifier may also be a search tool. When a user is searching for another user to connect with, he can keyword one of the ten moods and be connected through a shared emotion. All or any subset of panes that match this keyword will display more prominently highlighted and/or otherwise distinguished. The rest of the panes may be shaded out, disappear and/or are otherwise distinguished from the other panes, as shown in FIGS. 3A and 3B. Any searches discussed herein may also find (e.g., on the same counterpane or other counterpanes) tags or keywords that are similar, different, complementary, match or are affiliated in any way.

In various embodiments, the Moodifier may function in various ways. For example, if a user created his own counterpane (with many panes sharing his story), the Moodifier may be a search tool. The search tool may search the panes to provide a result showing which panes correspond to which emotion the user was feeling at the time he created the pane. For example, if a user was feeling hopeful (e.g., FIG. 3A), the panes in which he keyworded (or "moodified") himself as "hopeful" are more prominently displayed, highlighted and/ or otherwise distinguished. The rest of the panes may be shaded out, disappear and/or are otherwise distinguished from the other panes. A search for "Feeling Alone" may result in the same or different pictures being highlighted, with the rest shaded out, as shown in FIG. 3B. Any searches discussed herein may also find (e.g., on the same counterpane or other counterpanes) tags or keywords that are similar, different, complementary, match or are affiliated in any way.

In various embodiments, the Moodifier is a connector to others. The system may search and/or link users who may also be part of a website (e.g., same website, affiliated website, third party websites, etc.). The link may be based upon users whose emotions and experiences are similar (e.g., diabetes and high cholesterol), different (e.g., cancer and broken leg), complementary breast cancer and ovarian cancer), match or are otherwise affiliated (e.g., women's disorders). The user may have the option to be connected in this way with a selection on a home page, which has the profiles of numerous My Counterpane users.

In various embodiments, the user may have the option to be connected with a selection found at the bottom of the pane they can select. The button may be called "Transport" "Journey" or "Share". If selected, in various embodiments, the user's pane may be automatically added to his individual counterpane if he has created one for himself (to see a full individual counterpane, see for example, FIG. 1). Such transporting of a pane may be achieved by various data association methods. The transport feature may serve as a way for the counterpane to refine itself and/or bring up a subset of the users on the pane with the same mood. This may also be possible with a search option on the home page. [In each pane, there may be an option for an interactive element. The interactive element may include the ability for other users to comment on the person's story within that person's pane and/or to join a live chat (IM/Skype). Additionally, users may be able to subscribe to/follow other users and/or the moods they are in. Thus, when a user changes his mood keyword (or "re-moodifies" himself), subscribed users may receive an alert (via text, email, instant message, etc.) making them aware of this change. Such notifications may be achieved by the system maintaining a list of associations between users, so the system may have a list of users to notify, in response to a particular user changing a keyword. This may be accomplished in the preferences of the user when she creates her profile. Additionally, users may have the ability to choose to follow the journey of fellow users, and build their own communities.

In each My Counterpane community, there may be one individual who becomes a champion of the community. They may have more video about their history than the profile video questions and they, through an algorithm, be recommended as someone to contact for each user.

My Counterpane may demonstrate a focus on the personal story versus simply being a website solely filled with facts about the respective disorders. In various embodiments, the user may register and be offered an empty pane (and also the option of a guide which provides questions to answer) where the user can upload video, photos and text.

Exemplary questions in the guide may include: How did you know something was wrong? What are your symptoms now? What is your official diagnosis? How are you treating this/trying to get better? What are you doing about it? What is your greatest fear? What are the top three emotions you are feeling right now? What's been the biggest surprise of this experience so far? Anything you would like to add?

In various embodiments of a counterpane community, there may be numerous users, and each user may have a pane dedicated to the user's story. A pane may include a box of personal information that fits within many "boxes", or panes on the counterpane and a user wanting to create a profile in a 'box' registers for the site. Users may register using open API's of various websites and social networking tools such as Twitter and Facebook. Users may also be asked to agree to terms and conditions giving all content ownership to My Counterpane. Additionally, while registering, there may be settings that allow users to have the option to make their personal information, Moodifier Graph line and/or Moodifier Graph posts public or private. In a user's pane, there may be numerous elements of information (see FIG. 5). Exemplary elements of information may include a thumbnail from a video, text or a photo that was uploaded onto the user's pane. The users may be asked to provide a picture of themselves and then asked to provide responses to some of the questions mentioned in the previous section. This process may be guided, as a user registers. Known or subsequently developed technology facilitates uploads and acquiring video from a desktop, tablet, and/or smartphone The user may find additional information and links to explore in any portion of the website, and in various embodiments, the additional information and links may be in the background of the pane. Such links may lead to a range of different information about the user. Example information includes the following. A bio wherein the user presents basic information about him/herself (name, age, geographical location, career etc.). An initial diagnosis where the user gives detailed information of what the illness is. A story journal which is in the form of the Moodifier Graph that may include a combination of video, photos and text that actually tell the story of the user's health journey produced by the user, And a section where users may state their "lessons learned" which may also include a video, photos and text that the user wants to share as a result of his/her health experience.

Figure 5:
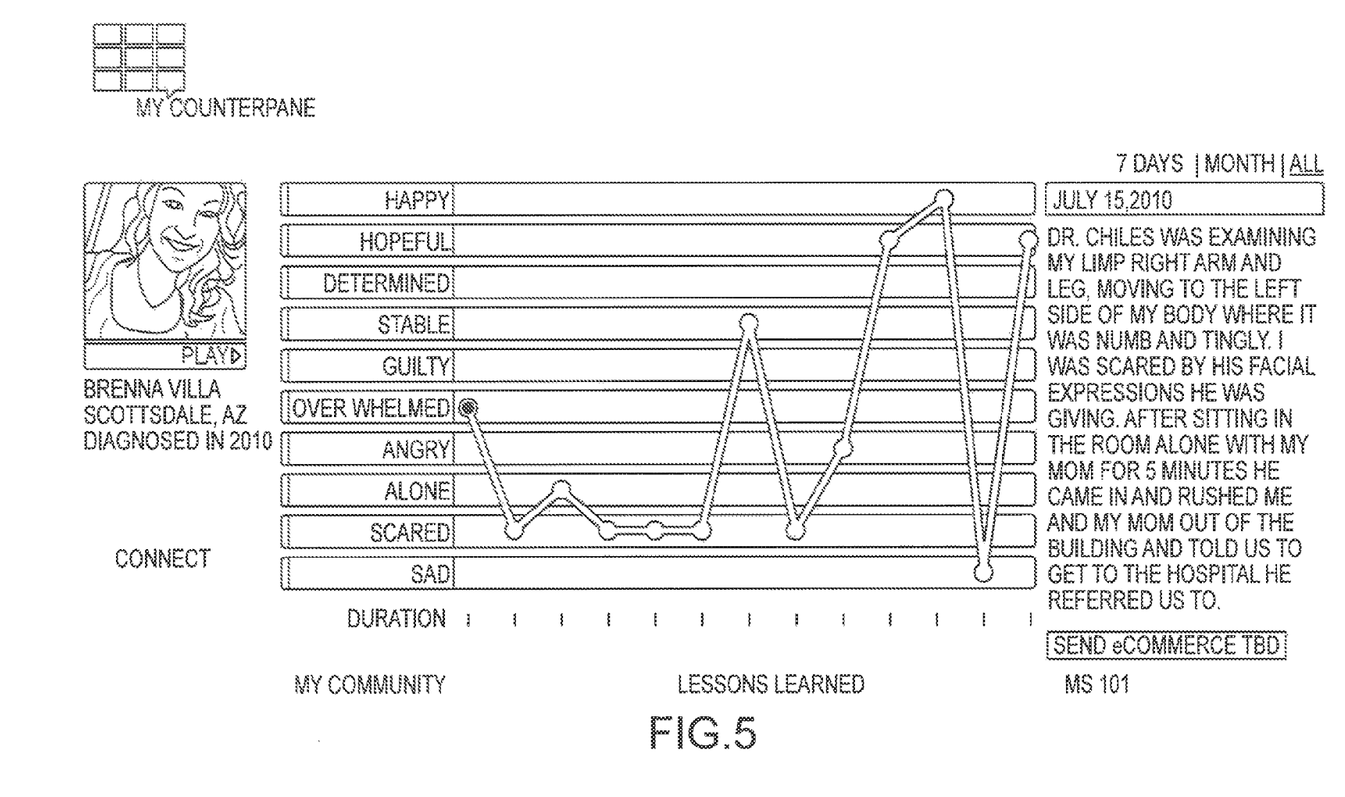
FIG. 5 includes exemplary elements of information and a mood graph that may be found within a pane as shown in FIG. 4, according to various embodiments of the disclosure.

Users update the Moodifier Graph (as shown in FIG. 5) which may include a handful of emotions that the user can select from that describe how he/she is feeling that day. This also may be periodically or continually updated, and may be the liaison to meet and join other users feeling the same way. Each mood listed may have a color affiliated with it and the color of the selected mood may be displayed somewhere within this pane, giving a way users can identify how another user is feeling without even diving into the details of his/her story. In various embodiments, and as shown in FIG. 5, the vertical axis lists 10 emotions (and the current corresponding exemplary colors) such as, Happy as pink, Hopeful as orange, Determined as yellow, Stable as green, Guilty as red, Overwhelmed as turquoise blue, Angry as "clear blue sky" blue, Alone as royal blue, Sacred as lavender and Sad as purple. The colors visually demonstrate how someone is feeling and outline each pane. The feelings may be updated as a user updates his/her Moodifier Graph. The horizontal axis lists the variable of time, which may be any period (e.g., days, weeks, months or years). The user may select in which timeframe he/she wants to chart his emotional journey. The horizontal axis has the ability to expand and retract to show different stretches of time. Points may be shown converging on the mood felt at which point in time, and that graph may be displayed next to the still photo of the user, so it is seen in response to another user selecting the user's pane.

In various embodiments, within a pane, an interactive element may exist. The interactive element may be accessed by a link. The interactive element may include the following examples. Resources/information may include a portal (e.g., direct) to existing health entities/sites that can provide basic information about chronic illness. Comments may include a place where users can post comments on the story they hear and start a direct dialogue with the user in the pane. Instant message may include a way for more direct and quicker dialogue between users. Social Network (e.g., Facebook and Twitter) links may be included.

As discussed herein, the My Counterpane function may have numerous windows ("panes") and each pane holds an individual story/profile of a user. In various embodiments, when a user enters a pane to view another user's video, an option may be available to send an item to the person whose video he/she is watching. When users create their profiles within the My Counterpane technology (or on the My Counterpane site), they may have the option to make themselves available to receiving items. Phrases and terms similar to an "item" may include any real or virtual good, service, information, experience, data, content, access, rental, lease, contribution, account, credit, debit, benefit, right, reward, points, coupons, credits, monetary equivalent, anything of value, something of minimal or no value, monetary value, non-monetary value and/or the like.

The list of items offered that a user can send may be tied directly to how the user in the video has modified him/herself. For example, if a user is sad, the gift offering might be flowers. If the user is hopeful, the viewer may be able to send a plant. The system may suggest (via a display of options) certain items to send, wherein the suggestions may be based upon the Moodifier. Vendors who are associated with the My Counterpane technology may have access to the address, financial and/or personal information of the recipient, but the users who decide to send the gifts to other users may not have access (or restricted access) to such information. A small percentage of the profit or revenue from the sales completed via the site may be retained by My Counterpane. The system may also provide advertising by vendors of such gifts.

Users may be able to send their gift in various formats such as real and virtual. For example, if the viewer selects "Send Flowers" to another user who has moodified himself as sad, the question that may next appear will be: "Send real flowers?" or "Send virtual flowers?"

When the viewer sends a gift that is real, in various embodiments, they may proceed with the vendor working with the My Counterpane technology in the typical style of buying an item online. For example, selecting their gift, inputting their credit card information and/or including a note. The gift may physically get delivered to the intended recipient. The system may include a counter within each profile, so viewers know if the option/market of sending that certain gift is saturated.

If a viewer wants to send a virtual gift, in various embodiments, the system may perform this function at no charge. This feature may be sponsored by a corporation or company wanting good will and that wants their name affiliated with My Counterpane/Moodifier technology and with the act of virtual gift giving. If a sender chooses virtual flowers, he may see a listing of the number of virtual flowers that have already been sent to the user in the video by other viewers ("this person has received 16 virtual lilies"). The sponsor, third parties or other participants may commit to paying a certain amount for each flower sent (e.g., a dollar a click) and a percentage of that dollar goes to an organization that aids with the affliction of the user in the video. For example, if a user has Multiple Sclerosis, and someone sends her a virtual lily after watching her video, the sponsor will give a percentage of its financial commitment per click to the National MS Society. The remainder of the percentage may go to My Counterpane, another charity and/or the vendor. When users create their profiles within the My Counterpane function, they may have the option to choose the organization they want donations to go to from these sponsors.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers. A user may include any individual, business, entity, government organization, software and/or hardware that interact with a system.

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the Internet.

Practitioner's will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, various components, modules, and/or engines of the system may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference, it is noted that the network may be implemented as other types of networks, such as an interactive television (ITV) network. Moreover, the system contemplates the use, sale or distribution of any goods, services or information over any network having similar functionality described herein.

The system may be partially or fully implemented in the cloud using cloud computing. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, POP, PKI and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc, (Armonk, N.Y.) is an example of a commercially available middleware product. An Enterprise Service Bus ("ESB") application is another example of in middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby, incorporated by reference.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an interact based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like, it should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A method comprising:
    providing, by a mood association computer, questions to assist a user in creating pane information and a pane;
    receiving, by the computer, the pane information,
    wherein the pane information includes comments and posts about thoughts and feelings related to a current illness,
        wherein the thoughts and feelings are about the current illness,
        wherein the thoughts and feelings are the thoughts and the feelings at a particular period of time when the pane was created,
        wherein the comments and posts about thoughts and feelings related to the current illness are video comments and posts reflecting the thoughts and the feelings during the particular period of time when the pane was created,
        wherein the video comments provide verbal communications and nonverbal communications about the thoughts and the feelings during the particular period of time when the pane was created,
    associating, by the computer, a tag and a date with the pane information,
        wherein the date associated with the pane information establishes the particular period of time when the thoughts and the feelings about the current illness existed;
    creating, by the computer, the pane including the pane information,
    wherein a counterpane comprises a plurality of panes;
    wherein the counterpane displays a community of users that are going through different phases of emotions and emotional states,
    receiving, by the computer, a mood indicator representing a mood associated with the pane during the particular period of time when the pane was created;
    wherein the mood indicator is also based on the feelings about the current illness at the particular period of time when the pane was created,
    associating, by the computer, the mood indicator with the pane;
    associating, by the computer, the mood indicator with the date of the pane information;
    associating, by the computer, a color to the pane information,
    wherein the color is based on the mood associated with the pane during the particular period of time when the pane was created,
    displaying, by the computer, different color panes in the counterpane such that similar moods can be associated;
    receiving, by the computer, a request for a requested mood,
    wherein the requested mood is associated with a need for emotional support related to the requested mood;
    searching, by the computer, the counterpane for requested panes associated with the requested mood;
    distinguishing, by the computer, the requested panes;
    displaying, by the computer, a moodifier graph representing changing emotions over time, based on the date associated with the pane information,
    wherein the emotions in the moodifier graph include the thoughts and the feelings at the particular period of time associated with the date,
    wherein the moodifier graph is a visual indicator of a recovery process over time,
    wherein the moodifier graph is defined by an X-axis representing a chronological timeline and a Y-axis representing a set of moods,
    wherein the moodifier graph visually presents emotional highs and lows over time, and
    wherein each point along the moodifier graph provides more information about the emotional state of the user,
    displaying, by the computer, virtual items sent to the user,
    wherein the virtual items support the recovery of the user;
    counting, by the computer, a number of virtual items sent to the user.

2. The method of claim 1, wherein the pane may include at least one of mood information, links, multi-media information, biographical data, geographical data, text, pictures, videos, stories, diagnosis information, keywords, descriptions, graphs and updates.

3. The method of claim 2, wherein the receiving the mood indicator comprises receiving the mood indicator based on selection of a list of mood indicators.

4. The method of claim 3, wherein the associating the mood indicator with the pane comprises at least one of using a keyword or tag on the pane.

5. The method of claim 4, wherein the mood indicator is updated based on the user's changing mood.

6. The method of claim 5, wherein the mood is associated with an experience.

7. The method of claim 6, wherein the mood is associated with an experience, wherein the experience is at least one of a chronic disorder, a health issue, a work issue, an interest, a political issue, an organization issue, an industry issue and a cultural issue.

8. The method of claim 7, wherein the searching the counterpane comprises searching a plurality of counterpanes.

9. The method of claim 8, wherein the searching the counterpane comprises searching a plurality of counterpanes from multiple websites.

10. The method of claim 9, wherein the searching the counterpane comprises searching a plurality of counterpanes associated with a similar experience.

11. The method of claim 10, wherein the requested mood is at least one of a similar mood, a complementary mood, a different mood and an affiliated mood.

12. The method of claim 11, further comprising adding a new pane to the counterpane.

13. The method of claim 12, further comprising sending an alert based on a change in the mood indicator.

14. The method of claim 13, further comprising sending an alert based on a change in the mood indicator, wherein the alert is sent to another user that requested the alert.

15. The method of claim 14, wherein the pane includes at least one of an interactive element, a biography, an initial diagnosis, a story journal, a mood journal, a mood journey, a mood graph, an update and lessons learned.

16. The method of claim 15, wherein at least one of a donation and loyalty points are provided based on items sent to a user.

* * * * *